(12) United States Patent
Goody

(10) Patent No.: US 9,933,021 B2
(45) Date of Patent: Apr. 3, 2018

(54) FLEXIBLE SHAFT COUPLING

(71) Applicant: AUTOGARD HOLDINGS LIMITED, London (GB)

(72) Inventor: Ross Goody, High Wycombe (GB)

(73) Assignee: AUTOGARD HOLDINGS LIMITED, London (GB)

( * ) Notice: Subject to any disclaimer, the term of this patent is extended or adjusted under 35 U.S.C. 154(b) by 106 days.

(21) Appl. No.: 14/892,300

(22) PCT Filed: May 21, 2014

(86) PCT No.: PCT/EP2014/060490
§ 371 (c)(1),
(2) Date: Nov. 19, 2015

(87) PCT Pub. No.: WO2014/187882
PCT Pub. Date: Nov. 27, 2014

(65) Prior Publication Data
US 2016/0091028 A1    Mar. 31, 2016

(30) Foreign Application Priority Data
May 22, 2013 (GB) .................................. 1309227.5

(51) Int. Cl.
*F16D 3/78* (2006.01)
*F16D 3/56* (2006.01)
*F16D 3/79* (2006.01)

(52) U.S. Cl.
CPC ................. *F16D 3/78* (2013.01); *F16D 3/56* (2013.01); *F16D 3/79* (2013.01)

(58) Field of Classification Search
CPC ................. F16D 3/56; F16D 3/78; F16D 3/79
(Continued)

(56) References Cited

U.S. PATENT DOCUMENTS 1,460,212 A * 6/1923 Olive ......................... F16D 3/79
2,126,707 A * 8/1938 Schmidt ................ F16F 1/3814
(Continued)

FOREIGN PATENT DOCUMENTS

FR          658681    *  7/1929    ...................... 464/98
FR          659681    *  7/1929    ...................... 464/98
(Continued)

OTHER PUBLICATIONS

International Search Report dated Jul. 17, 2015 in connection with PCT/EP2014/060490.
(Continued)

*Primary Examiner* — Gregory Binda
(74) *Attorney, Agent, or Firm* — Quarles & Brady LLP

(57) ABSTRACT

A flexible hub connection is disclosed for joining a first rotatable shaft with a second rotatable shaft so that torque can be transmitted between the shafts through the connection. The connection comprises a first flexible means having a first flex plane, a second flexible means having a second flex plane and, an intermediate member. The first flexible means is connected between the first rotatable shaft and the intermediate member, while the second flexible means is connected between the intermediate member and the second rotatable shaft. The first flex plane and second flex plane being substantially coplanar.

4 Claims, 2 Drawing Sheets

(58) Field of Classification Search
USPC .................................................... 464/95, 99
See application file for complete search history.

(56) References Cited

U.S. PATENT DOCUMENTS

| | | |
|---|---|---|
| 5,387,157 A | 2/1995 | Nameny |
| 5,700,197 A | 12/1997 | Kuribayashi |
| 5,944,611 A | 8/1999 | McCullough |
| 6,622,839 B2 * | 9/2003 | Kundermann ...... F16D 25/0638 |
| 2006/0183558 A1 | 8/2006 | Feldmann |
| 2007/0082744 A1 | 4/2007 | Corey |
| 2010/0184520 A1 | 7/2010 | Geislinger et al. |

FOREIGN PATENT DOCUMENTS

| | | |
|---|---|---|
| GB | 1153864 A | 5/1969 |
| GB | 2 060 135 A | 4/1981 |
| GB | 2192969 A | 1/1988 |

OTHER PUBLICATIONS

PCT International Preliminary Report on Patentability, PCT/EP2014/060490, dated Dec. 3, 2015.

* cited by examiner

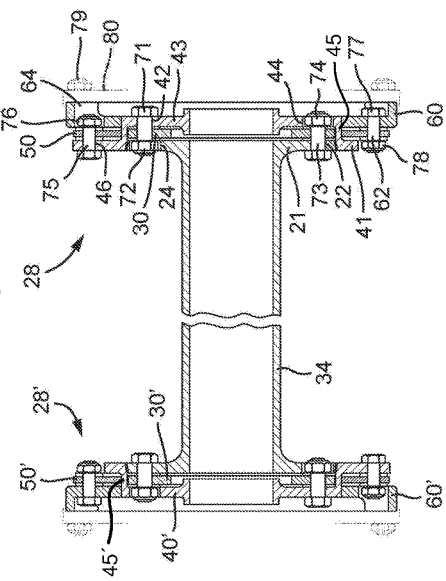
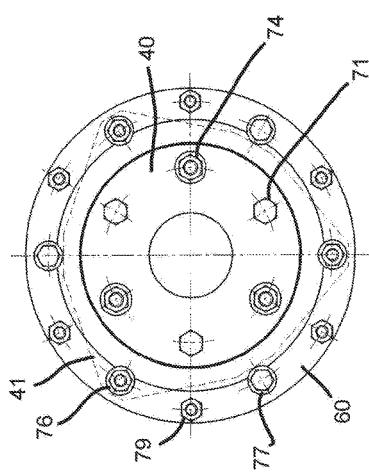

FLEXIBLE SHAFT COUPLING

CROSS-REFERENCE TO RELATED APPLICATIONS

This application represents the national stage entry of PCT International Application No. PCT/EP2014/060490 filed May 21, 2014, which claims priority to Great Britain Patent Application No. 1309227.5, filed May 22, 2013, the contents of which are hereby incorporated by reference in their entirety for all purposes.

FIELD OF THE INVENTION

The present specification relates to flexible shaft couplings, particularly disc pack couplings, for transmitting torque between a rotating input and output that are spaced but which may be misaligned.

BACKGROUND OF THE INVENTION

Disc pack couplings are commonly used to connect a driving shaft, from a power output apparatus such as a motor or a turbine, to a shaft to be driven, which is connected to a power input apparatus such as a pump or a generator.

It is not always possible to construct or position the power output apparatus and the power input apparatus so that the driving shaft (the shaft being driven) and driven shaft (the shaft being driven) are exactly aligned. In any case, the running of the machines, wear and tear, and environmental factors may later the relative positions of the driving shaft and driven shaft. The coupling between the driving shaft and driven shaft must be able to account for or compensate for such changes in alignment. In some applications, the coupling may also have to cope with sudden changes of rotation, and the direction of rotation changing.

A common means of doing this is the use of disc pack couplings. A spacer shaft is located between the driven shaft and the driving shaft. Disc packs are placed between the driven shaft and the spacer shaft to join them, and between the driving shaft and the spacer shaft. Each disc pack comprises a plurality of annular plates. Each disc pack is attached to the two shafts it joins at alternating points around its body, so that the disc pack can flex between these alternating connections. The disc pack transfers torque, so that rotation of the driving shaft causes the spacer shaft to rotate, which in turn causes the driven shaft to rotate. The disc pack though can flex to accommodate an axial separation between the spacer shaft and the driven shaft, an angular misalignment, or a combination of these two things. The joint provided by the disc pack between the driving shaft and the spacer shaft flexes in the same manner.

Misalignment of the input and driving shafts may be characterised as angular (where the two shafts' axes are not parallel), radial (where the two shafts' axes are parallel but not co-axial) and axial (where the distance between the ends of the two shafts is incorrect), and in general a combination of each type of misalignment will be present.

The amount of misalignment that a single disc pack can accommodate, known as the maximum angular misalignment, is particularly influenced by the size of the disc pack and the torque that is to be transmitted. Typically though, a disc pack can accommodate ½° to 1½° of angular misalignment. This also determines the amount of radial misalignment that the two disc packs and spacer shaft can accommodate. If axial alignment must be accommodated, this reduces the angle that the disc pack can accommodate.

SUMMARY OF THE INVENTION

The object of the present invention is to provide a flexible coupling arrangement that accommodates a wide range of misalignment, particularly angular misalignment.

According to the present invention, there is provided a flexible hub connection for joining a first rotatable shaft with a second rotatable shaft so that torque can be transmitted between the shafts through the connection, the connection comprising a first disc pack having a first flex plane, a second disc pack having a second flex plane, and an intermediate member. The first disc pack is connected between the first rotatable shaft and the intermediate member, the second disc pack is connected between the intermediate member and the second rotatable shaft, and the first flex plane and the second flex plane are substantially coplanar.

Each flexible means couples rotating parts, allowing them to pivot about a flex point. The flex plane is the plane perpendicular to the axis of rotation which intersects through the flex point.

Substantial coincidence of the flex planes is used herein to indicate that the flex planes may be separated by a small distance such that the flexible coupling can support a shaft without the inertia of the shaft rotation causing the flexible coupling to bend.

BRIEF DESCRIPTION OF THE DRAWINGS

The invention will now be described, by way of example, with reference to the drawings, of which

FIG. 2 is an side elevation, along the axis, of the dual hub connection; and

FIG. 3 is a longitudinal section of the dual hub connection.

DETAILED DESCRIPTION OF THE PREFERRED EXAMPLE EMBODIMENT

Figure 1:
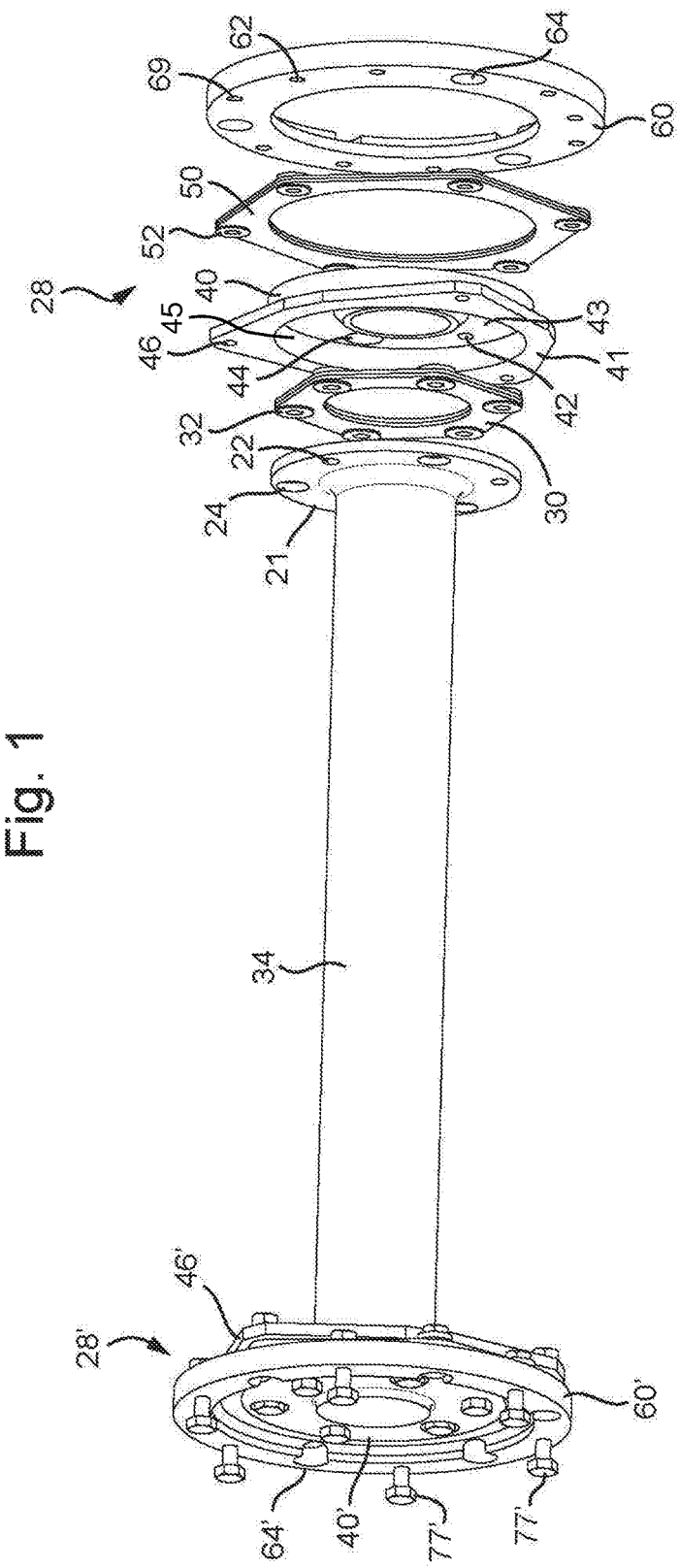
FIG. 1 is an perspective view of the dual hub connection with one hub exploded.

Referring to FIG. 1, a flexible disc coupling comprises a spacer shaft 34, a first hub connection 28' and a second hub connection 28. The spacer shaft 34 is simply a rigid cylinder that spans the distance between the driven shaft and driving shaft (neither of which are shown), and transmits torque. Each end of the spacer shaft 34 terminates in a spacer flange 21 (the spacer shaft and flange may be formed as a single integral piece, or assembled from separate components). The spacer flange 21 connects to a first flexible disc pack 30, an inner adapter 40, a second flexible disc pack 50, and outer adapter 60 arranged in that order. Each spacer flange is arranged with these parts (the parts of the opposite spacer flange 28' being arranged in the reverse order and are indicated using the same numerals but with a prime).

Each spacer flange 21 includes a plurality of flange holes, equally spaced. Two diameters of holes are provided, a smaller diameter flange hole 22, and a larger diameter flange hole 24. The smaller diameter flange holes 22 and larger diameter flange holes 24 alternate. The first flexible disc pack 30 comprises a plurality of generally annular plates, held in a unitary formation. The plates all feature holes spaced around the length of the disc. A convenient way to clamp the discs together with by means of hollow rivets fixed in the holes 32, though the discs could be held together in some other manner (bolts 71, 73, 75, 77 penetrate the disc packs as will be described below; these bolts could also function to constrain the disc packs together). The number and position of the first disc pack holes 32 correspond to that of the spacer flange holes 22, 24, while the diameter of the first disc pack holes 32 is similar to that of the small diameter flange holes 22.

The inner adapter 40 comprises a short cylindrical body 45 from which a first flange 41 extends radially outwards from one end of the cylindrical body 45, and from which a second flange 43 extends radially inwards from the end of the cylindrical body 45. The cylindrical body 45 and second flange 43 together define a cylindrical seat that is sized to receive the first disc pack 30 and the spacer flange 21.

The second flange 43 of the inner adapter 40, like the spacer flange 21, features two diameters of holes, a smaller diameter flange hole 42, and a larger diameter flange hole 44, again in an alternating arrangement, and again aligned with the first disc pack holes 32. The inner adapter flange holes 42, 44 therefore also align with the spacer flange holes 22, 24. However, the holes are arranged so that the larger diameter inner adapter flange holes 44 align with the smaller diameter spacer flange holes 22, and the smaller diameter inner adapter flange holes 42 align with the larger diameter spacer flange holes 24.

The second flexible disc pack 50 is similar to the first flexible disc pack 30. Like the first disc pack, comprises a plurality of generally annular plates, though of a larger diameter, which are held in a unitary formation. The plates all feature holes 52 spaced around the length of the disc, which again may be clamped using hollow rivets fixed in the holes 52. The outer adaptor 60 is generally annular.

The outer adapter 60, includes a plurality of holes, equally spaced. As for the spacer flange 21, two diameters of holes are provided, a smaller diameter outer adapter hole 62, and a larger diameter outer adapter hole 64. The smaller diameter outer adapter holes 62 and larger diameter outer adapter holes 64 alternate. The number and position of the second disc pack holes 32 correspond to that of the outer adapter holes 62, 64, while the diameter of the second disc pack holes 32 is similar to that of the small diameter outer adapter holes 62.

Referring now to FIGS. 2 and 3, the first flexible disc pack 30 and the flange 21 of the spacer flange 21 are positioned in the cylindrical seat defined by the cylindrical body 45 and second flange 43. The spacer flange 21, first disc pack 30 and inner adapter 40 are arrange so that the spacer flange holes 22, 24 are aligned with the first disc pack holes 32 and the inner adapter holes 42, 44 on the second flange 43. Also, the alignment is such that the larger diameter holes 24 on the spacer flange 21 align with the smaller diameter holes 42 on the inner adapter, and the smaller diameter holes 22 on the spacer flange 21 align with the smaller diameter holes 44 on the inner adapter.

The first disc pack 30 and inner adapter 40 are secured together by bolts 71 and locking nuts 72. The bolts 71 are introduced into the smaller diameter holes 42 on the inner adapter, and the corresponding first disc pack holes 32 larger diameter holes 24 on the spacer flange 21. The head of the bolt 71 is wider than the diameter of the smaller diameter holes 42. The locking nut 72 engages with the thread of the bolt 71, and is tightened to first disc pack 30 and inner adapter 40. The locking nut 72 is not as wide as the larger diameter holes 24, and does not engage with the spacer flange; the larger diameter holes 24 simply provides access for the locking nut 72 to engage the thread of the nut 71.

The first disc pack 30 and spacer flange 21 are secured together in a similar manner, by bolts 73 and locking nuts 74. The bolts 73 are introduced into the smaller diameter holes 22 on the spacer flange 21 and the corresponding first disc pack holes, the head of the bolt 73 abutting spacer flange. The locking nut 74 is located in the larger diameter holes 44 of the inner adapter 40 to engage with the thread of the bolt 73, and is tightened to secure the first disc pack 30 and to the spacer flange 21. Again, the locking nut 74 is not as wide as the larger diameter holes 44, and does not engage with the inner adapter 40, the larger diameter holes 44 simply provides access for the locking nut 74 to engage the thread of the nut 73.

The first disc pack 30 is therefore secured by alternate holes 32 to the spacer flange 21 and the inner adapter 40. Torque applied to the inner adapter 40 is transmitted through the first disc pack 30 to the spacer flange 21, and equally, torque may be transmitted from the spacer flange 21 through the first disc pack 30 to the inner adapter 40. The flexing of the disc pack allows the inner adapter 40 and the spacer flange 21 an amount of axial separation or angular misalignment, or both.

The second disc pack is secured between the inner adapter 40 and outer adapter 60 in a similar manner. The second disc pack 50 and inner adapter 40 are secured together by bolts 75 and locking nuts 76. The bolts 75 are introduced into the smaller diameter holes 46 on the inner adapter, and the corresponding second disc pack holes 52 larger diameter holes 64 on the outer adapter 60. The head of the bolt 75 is wider than the diameter of the smaller diameter holes 46. The locking nut 76 engages with the thread of the bolt 75, and is tightened to second disc pack 50 and inner adapter 40. The locking nut 76 is not as wide as the larger diameter holes 64, and does not engage with the outer adapter; the larger diameter holes 64 simply provides access for the locking nut 76 to engage the thread of the bolt 75.

The second disc pack 50 and outer adapter 60 are secured together by bolts 77 and locking nuts 78. The bolts 77 are introduced into the smaller diameter holes 62 on the outer adapter 60 and the corresponding second disc pack holes, the head of the bolt 77 abutting outer adapter. The locking nut 78 then engages with the thread of the bolt 77, and is tightened to secure the second disc pack 50 and to the outer adapter 60. It will be noted that the flange 41 of the inner adapter 40 does not include larger diameter holes to allow the locking nut 78 to access the thread of bolt 73, instead, the flange is simply truncated in these regions to allow unimpeded access to the bolt thread.

The second disc pack 50 is therefore secured by alternate holes 52 to the outer adapter 60 and the inner adapter 40. Torque applied to the outer adapter 60 is transmitted through the second disc pack 50 to the inner adapter 40, and equally, torque may be transmitted from the inner adapter 40 through the second disc pack 50 to the outer adapter 60. In the same manner as for the first disc pack, the flexing of the second disc pack allows the inner adapter 40 and the outer adapter 60 an amount of axial separation or angular misalignment, or both.

The outer adapter 60 is then secured to the hub of a driving shaft 80 by bolts 79 engaging with threaded holes 69 in the outer adapter 60.

If the maximum angular misalignment of the first disc pack 30 is $\Delta K_{W1}$ and that of the second pack 50 is $\Delta K_{W2}$ the maximum angular misalignment of either hub connection will be $(\Delta K_{W1}+\Delta K_{W2})$, and that of the coupling as a whole will be $2(\Delta K_{W1}+\Delta K_{W2})$. By using four disc packs with similar capabilities to existing disc packs therefore, an approximate doubling of angular misalignment can be accommodated. Alternatively, cheaper disc packs with smaller maximum angular misalignment values can be used, and the amount of flexing and stress on each disc pack can be reduced, increasing their life and reliability. The maximum axial misalignment of the coupling is the sum of the maximum axial misalignment of the individual disc packs. As for prior art disc packs, the more angular misalignment that is accommodated, the less axial misalignment can be accommodated and vice versa. Each disc pack may be chosen to accommodate a similar angular misalignment, but equally one may choose disc packs of differing capabilities, e.g. the larger outer disc pack may be able to accommodate a greater angular misalignment than the inner disc pack.

It is important to note that the first disc pack 30 and second disc pack 50 are arranged to lie in the same transverse plane. A small amount of axial separation of the two disc packs in each hub can be included in the design, but as the axial separation the inertia of the spacer shaft 34 will tend to radially displaced it from the axis between the driven shaft and driving shaft, with the displacement increasing with increasing speed of rotation. This may cause the spacer shaft and the disc packs at both ends of the spacer shaft to bow outwards, even when there is no misalignment present. The degree of axial separation of the planes of the disc packs that can be tolerated will therefore be determined by factors such as the maximum speed of rotation, the mass of the shaft and components, and the bending and stiffness characteristics of the disc packs.

The first disc pack 30 and second disc pack 50 will both experience the same bending force. They will typically be chosen so that the maximum axial misalignment is equal, or nearly so.

The disc packs shown here are of a hexagonal design, but equally round and scalloped discs could be used, and equally disc packs having any number of sides e.g. square or cruciform (such as shown in GB1153864), octagonal (such as shown in GB2192969), 16-sided polygon, etc, or a modified shape such as shown in U.S. Pat. No. 5,387,157 or US2010184520. In fact, any flexible member or members suitable for use in a flexible disc coupling can be arranged using the principles set out herein. The disc pack need not be single discs arranged in a laminate pattern. They may be radially split into a plurality of links or arc segments stretching between each bolts or other fixings located on the spacer flange and inner adapter, and similarly stretching between bolts or other fixings located on the inner adapter and outer adapter, such as shown in U.S. Pat. No. 5,700,197 or U.S. Pat. No. 5,944,611.

Similarly, the precise form of the adaptors, in particular the flange or mounting that supports the bolts or other torque transferring fastener, could be similarly varied. Round adaptors (as shown here on flanges 21 and 60) are a simple design, or material may be saved by simply omitting the arc of material where the larger diameter hole is provided in the spacer flange 21 and outer adapter 60 (as is already shown on the first flange 41 of the intermediate adaptor), or the flanges could be scalloped or polygonal. The bolts that transfer the torque could be substituted by other torque transferring elements that engage with the flexible disc pack.

The embodiment here shows each hub connection having two disc packs arranged in a transverse plane. The principle could be extended to three or more disc packs all arranged concentrically in a single plane. Also, hub connection described here is ideally suited to use in a double hub connection system, each hub being separated by a spacer shaft. This hub connection could though also be used in as a single hub connection placed directly between a driving shaft and a driven shaft.

As well as arranging flexible disc pack couplings in this configuration, the same principle could be applied to other couplings where presently a rotating input and rotating output are joined in a flexible manner between opposing or engaging faces, inner diameters or outer diameters at a single flex point. Joints with limited angular movement are amenable to this treatment.

What is claimed is:

1. A flexible hub connection for joining a first rotatable shaft with a second rotatable shaft so that torque can be transmitted between the shafts through the connection, the connection comprising;
   a first disc pack having a first flex plane;
   a second disc pack having a second flex plane; and
   an intermediate member comprising a short cylindrical body from which a first flange extends radially outwards from one end of the cylindrical body, and from which a second flange extends radially inwards from another end of the cylindrical body,
   the first disc pack being connected between the first rotatable shaft and the first flange of the intermediate member, the second disc pack being connected between the second flange of the intermediate member and the second rotatable shaft, the first flex plane and second flex plane being substantially coplanar.

2. A flexible hub connection according to claim 1, wherein the first disc pack is generally annular, and is connected to the first rotatable shaft at a first radially spaced set of points, and connected to the intermediate member at a second radially spaced set of points, the first set of points and second set of points not being axially coincident.

3. A flexible hub connection according to claim 1, wherein the second disc pack is generally annular, and is connected to the second rotatable shaft at a first radially spaced set of points, and connected to the intermediate member at a second radially spaced set of points, the first set of points and second set of points not being axially coincident.

4. A flexible coupling comprising two hub connections according to claim 1, the two hub connections being joined in series.

* * * * *